P. H. RAMSDELL.
MOVING PICTURE MACHINE.
APPLICATION FILED FEB. 26, 1920.
1,404,648.
Patented Jan. 24, 1922.
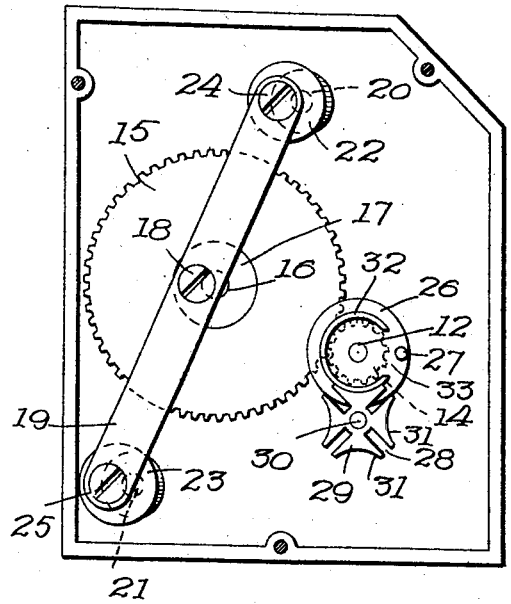
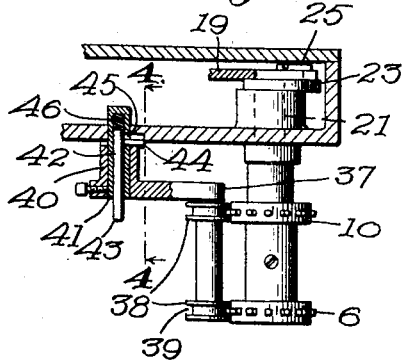
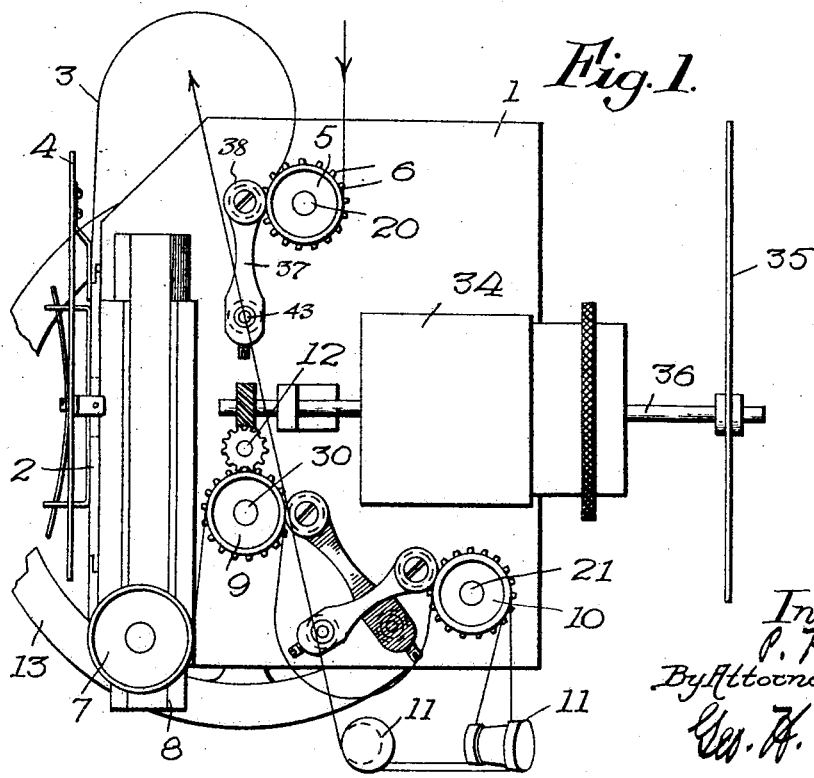
Inventor
P. H. Ramsdell
By Attorney
Geo. H. Kennedy

UNITED STATES PATENT OFFICE.

PHILIP H. RAMSDELL, OF WORCESTER, MASSACHUSETTS.

MOVING-PICTURE MACHINE.

1,404,648.  Specification of Letters Patent.  Patented Jan. 24, 1922.

Application filed February 26, 1920. Serial No. 361,415.

*To all whom it may concern:*

Be it known that I, PHILIP H. RAMSDELL, a citizen of the United States, residing at Worcester, in the county of Worcester and Commonwealth of Massachusetts, have invented a new and useful Improvement in a Moving-Picture Machine, of which the following, together with the accompanying drawings, is a specification.

My invention relates to moving picture machines or projectors, and it has for its object to provide a moving picture machine that is extremely simple in its construction, and comprises a small number of moving parts, as compared with moving picture machines heretofore constructed.

In the accompanying drawings,

Figure 1 is a view in side elevation of a portion of a moving picture machine embodying my invention, the casing being removed to show the parts.

Figure 2 is a view in side elevation looking at the parts shown in Fig. 1 from the opposite side.

Figures 3 and 4 are detailed views of a device for retaining the film.

Similar reference characters refer to similar parts in the different figures.

Referring to Fig. 1, the machine comprises a frame 1 generally rectangular in form, upon which is mounted a race plate 2 for a film 3 that is held in engagement therewith by means of a hinged gate 4 pressing on the film. The film 3 is coiled on a supply reel, not shown, suitably supported above the frame 1 and adapted to deliver the film to a feed roll 5 provided on its periphery with sprockets 6 adapted to engage spaced openings provided on the edges of the film 3, in the usual manner. The film 3 after passing between the gate 4 and the plate 2 passes under a guide roll 7 rotatably mounted on a slide 8 adapted for vertical adjustment.

The film 3 passes from the guide roll 7 over a sprocket roll 9 having an intermittent rotative movement which will be hereinafter described. From here the film passes over a feed roll 10 and then downwardly to a plurality of cone rolls 11 which serve to change the direction of movement of the film sufficiently to allow it to pass upwardly to a coiling reel, not shown, that is mounted beside the supply reel.

Referring now to Figs. 1 and 2, a shaft 12 is rotatably mounted on the frame 1 and is provided at its end with a pulley 13, shown partially in Fig. 1, by means of which it may be driven from a suitable source of power, not shown. The shaft 12 is provided with a pinion 14 that is in mesh with a gear 15 rotatably mounted on a shaft 16. A crank disk 17 carried on the gear 15 is provided with a crank pin 18 which carries a connecting rod 19. The rolls 5 and 10 are respectively mounted on shafts 20 and 21 which extend through the frame and are provided with crank disks 22 and 23 that are eccentric to the shafts 20 and 21, respectively. The rod 19 is connected at its ends to the disks 22 and 23 by crank pins 24 and 25, so that when the shaft 16 is driven from the shaft 12, the rolls 5 and 10 are driven in unison therewith and at the same speed.

The shaft 12 is further provided with a crank disk 26 upon which is carried a pin 27 adapted to engage in the slots 28 of a driving head 29. The driving head 29 is carried on a shaft 30 that extends through the frame 1 and carries the sprocket roll 9 at its other end. The driving head 29 is further provided with curved surfaces 31 between the slots 28 that are adapted to engage an annular projection 32 carried by the crank disk 26. The projection 32 is cut away on either side of the pin 27 as shown at 33. When the shaft 12 is rotated the pin 27 enters one of the slots 28 and turns the head 29 through substantially 90° after which it is freed therefrom. The head 29 remains stationary while the pin 27 completes one revolution, one of the curved surfaces 31 then being in engagement with the annular projection 32 to prevent rotation of the shaft 30 during this movement. In this way an intermittent rotative movement is imparted to the shaft 30, the roll 9 making one complete revolution for substantially every four revolutions of the driving shaft 12. The speed reduction between the shafts 12 and 16 is also four to one.

When the machine is operating, the rotation of the roll 5 unwinds the film from the supply reel and delivers it to the race plate 2. The intermittent rotation of the roll 9 imparts a step-by-step movement to the film 3 as it passes between the gate 4 and the plate 2. The aperture in which the film is framed is in line with a suitable source of light, not shown, and a lens tube 34. A shutter 35 is carried on a shaft 36 extending beyond the end of the lens tube 34 and is provided with the usual shutter openings. The shaft 36 is driven from the shaft 12 through spiral gears, whereby the shutter 35 is rotated at such a speed that its openings will register with the lens tube 34 and the race plate aperture when the film is framed therein. The roll 10 being driven at the same speed as the roll 5, serves to deliver the film to the coiling reel.

Referring now to Figs. 3 and 4, each of the rolls 5, 9 and 10 is provided with a film retaining device that comprises a pivotally mounted arm 37, at the end of which is mounted a pair of idler rolls 38. The sprockets 6 of the feed roll 10 are received in grooves 39 provided in each of the rolls 38 which are thus adapted to ride on the portions of the film 3 on either side of the sprockets, and thereby serve to maintain the film in engagement with the roll 10. The arm 37 is provided at its other end with a hub 40 that is loosely mounted on a stud 41 carried by the frame 1. The stud 41 is provided with a central opening 42 within which is located a plunger 43 that is provided with a pin 44 projecting through a slot 45 provided in the stud 41. A spring 46 is located at the bottom of opening 42 and normally serves to hold the pin 44 at the end of the slot 45. The hub 40 is provided with a plurality of notches 47 and 48, that are adapted to receive the pin 44. When the pin 44 is in the square notch 47 the arm 37 is locked so that the idler rolls 38 engage the film 3 and prevent it from slipping off the sprockets 6. When it is desired to release the film the plunger 43 is pushed in and the arm 37 is turned until the pin 44 engages in the notch 48, in which position the arm 37 is held away from the roll 10. An inclined surface 49 is provided between the notches 47 and 48, so that the pin 44 may move from the notch 48 to the notch 47, without depressing the plunger when it is desired to turn the arm 37 back into its locking position.

From the foregoing it is apparent that I have provided a moving picture machine that is extremely simple in construction, since it comprises a relatively small number of moving parts. The several feed rolls for moving the film are driven from the shaft 16 without the use of any intermediate gearing whatsoever, thereby greatly simplifying the mechanism, as compared with those heretofore constructed. The only gears employed in connection with the rolls are the two gears for obtaining the speed reduction between the shafts 12 and 16. The film is always maintained in engagement with the sprocket rolls by means of the locking devices coacting with the arms which carry the idler rolls. The combination of the locking device with the pivotal support of the idler roll arm provides an extremely simple construction that is easily assembled, and may be conveniently operated when it is desired to release the film.

While I have shown my invention in its simplest preferred form, it is not so limited, but is susceptible of various modifications within the scope of the appended claims.

I claim,

1. In a machine of the class described, a feed roll carrying a film, a pivotally mounted arm carrying an idler roll, and means embodied in the pivotal support of said arm for locking the idler roll in engagement with the film in one position of said arm and for yieldingly maintaining said roll out of engagement with the film in another position of said arm.

2. In a machine of the class described, a feed roll carrying a film, a pivotally mounted arm carrying an idler roll, and a movable plunger coaxial with the pivotal support of said arm for locking said arm in position with the idler roll in engagement with the film.

3. In a machine of the class described, the combination with a feed roll carrying a film and a pivotally mounted arm carrying an idler roll, of a spring pressed plunger coaxial with the pivotal support of said arm for locking said idler roll in engagement with the film in one position of said arm and for yieldingly maintaining said idler roll out of engagement with the film in another position of said arm.

4. In a machine of the class described, the combination with a feed roll carrying a film and a pivotally mounted arm carrying an idler roll, of a spring pressed plunger coaxial with the pivotal support of said arm and provided with a pin adapted to engage in a notch in said arm for locking said idler roll in engagement with the film.

5. In a machine of the class described, the combination with a feed roll carrying a film and a pivotally mounted arm carrying an idler roll, of a spring pressed plunger coaxial with the pivotal support of said arm and provided with a pin adapted to engage either a square notch in said arm for locking said idler roll in engagement with the film, or a bevelled notch in said arm for yieldingly maintaining said roll out of engagement with the film.

PHILIP H. RAMSDELL.